United States Patent
Tawil et al.

(10) Patent No.: US 7,853,197 B2
(45) Date of Patent: *Dec. 14, 2010

(54) APPARATUS AND METHOD FOR REUSING SATELLITE BROADCAST SPECTRUM FOR TERRESTRIALLY BROADCAST SIGNALS

(76) Inventors: Carmen Tawil, 5929 Balcones Dr., Suite 202, Austin, TX (US) 78731; Saleem Tawil, 5929 Balcones Dr., Suite 202, Austin, TX (US) 78731

( * ) Notice: Subject to any disclaimer, the term of this patent is extended or adjusted under 35 U.S.C. 154(b) by 1334 days.

This patent is subject to a terminal disclaimer.

(21) Appl. No.: 11/289,864

(22) Filed: Nov. 30, 2005

(65) Prior Publication Data

US 2006/0079176 A1  Apr. 13, 2006

Related U.S. Application Data

(63) Continuation of application No. 10/353,376, filed on Jan. 29, 2003, now Pat. No. 6,983,123, which is a continuation of application No. 09/791,470, filed on Feb. 23, 2001, now Pat. No. 6,519,446, which is a continuation of application No. 09/001,766, filed on Dec. 31, 1997, now Pat. No. 6,208,834, which is a continuation-in-part of application No. 08/731,244, filed on Oct. 11, 1996, now Pat. No. 5,761,605.

(51) Int. Cl.
*H04H 20/74* (2008.01)
*H04B 7/185* (2006.01)

(52) U.S. Cl. .................. 455/3.02; 455/12.1; 455/63.1

(58) Field of Classification Search ............... 455/3.01, 455/3.02, 12.1, 13.3, 63.1, 179.1, 188.1, 455/272, 427, 430, 561, 562.1; 725/63, 67, 725/68

See application file for complete search history.

(56) References Cited

U.S. PATENT DOCUMENTS

2,653,238 A   9/1953   Bainbridge
(Continued)

FOREIGN PATENT DOCUMENTS

DE            1221694            7/1961
(Continued)

OTHER PUBLICATIONS

Widley, "TV Distribution in Technology-Neutral Franchises Using MVDS," Electronics Division, Colloquim on 'MVDS: The Way Forward' (Apr. 7, 1992), Digest No. 78, London, England, 7 pgs.
(Continued)

*Primary Examiner*—Quochien B Vuong
(74) *Attorney, Agent, or Firm*—The Culbertson Group, P.C.; Russell D. Culbertson

(57) ABSTRACT

A satellite receiving antenna at a user location receives satellite signals at a first frequency from a satellite. The satellite signals travel along a satellite signal route encompassed within an aperture of the satellite receiving antenna. A terrestrial transmitter transmits signals at the first frequency along a wireless transmission route from the transmitter to the user location. The terrestrial transmitter is located with respect to the user location so that the wireless transmission route is outside of the aperture of the satellite receiving antenna. Also the terrestrial transmission power is controlled so that the terrestrial signals present at the user location result in terrestrial input signals from the satellite receiving antenna which are below an interference signal power level with respect to satellite input signals produced by the satellite receiving antenna. Thus, the terrestrial signals do not interfere with the satellite signals even though they are transmitted at a common frequency. However, the terrestrial signals are maintained at a power level at the user location such that information may be extracted from terrestrial signals.

14 Claims, 3 Drawing Sheets

U.S. PATENT DOCUMENTS

| | | | |
|---|---|---|---|
| D195,261 S | 5/1963 | McAuley |
| D196,050 S | 8/1963 | Finkel et al. |
| 4,097,708 A | 6/1978 | Bickel |
| 4,198,639 A | 4/1980 | Killion |
| D275,197 S | 8/1984 | Feagle |
| 4,523,155 A | 6/1985 | Walczak et al. |
| 4,613,990 A | 9/1986 | Halpern |
| 4,630,108 A | 12/1986 | Gomersall |
| D304,337 S | 10/1989 | Tai |
| D305,766 S | 1/1990 | Tai |
| D306,862 S | 3/1990 | Kent |
| 5,038,151 A | 8/1991 | Kaminski |
| 5,041,840 A | 8/1991 | Cipolla et al. |
| 5,115,463 A | 5/1992 | Moldavsky et al. |
| 5,125,109 A | 6/1992 | Geller et al. |
| 5,204,981 A | 4/1993 | Karasawa et al. |
| 5,276,904 A | 1/1994 | Mutzig et al. |
| 5,374,938 A | 12/1994 | Hatazawa et al. |
| 5,394,561 A | 2/1995 | Freeburg |
| 5,444,762 A | 8/1995 | Frey et al. |
| 5,483,663 A | 1/1996 | Tawil |
| 5,511,233 A | 4/1996 | Otten |
| 5,541,963 A | 7/1996 | Nakagoshi |
| 5,584,046 A | 12/1996 | Martinez et al. |
| 5,604,508 A | 2/1997 | Atkinson |
| 5,729,825 A | 3/1998 | Kostreski et al. |
| 5,761,605 A | 6/1998 | Tawil et al. |
| 6,169,878 B1 | 1/2001 | Tawil et al. |
| 6,208,834 B1 | 3/2001 | Tawil et al. |
| 6,356,737 B1 | 3/2002 | Bjurfjell |
| 6,519,446 B2 | 2/2003 | Tawil et al. |

FOREIGN PATENT DOCUMENTS

| | | |
|---|---|---|
| DE | 1953595 | 10/1969 |
| EP | 0025739 A1 | 8/1980 |
| EP | 0597225 A1 | 9/1993 |
| EP | 0 712 215 A2 | 5/1996 |
| EP | 0 732 814 A2 | 9/1996 |
| EP | 0 795 970 A2 | 9/1997 |
| GB | 2249668 A | 5/1992 |
| JP | 57154909 A | 9/1982 |
| JP | 61-161057 | 7/1986 |
| JP | 63-187926 | 8/1988 |
| JP | 63-211927 | 9/1988 |
| JP | 411486 A1 | 1/1992 |
| JP | 04-077126 | 3/1992 |
| JP | 06-061900 | 3/1994 |
| JP | 6-120852 A | 4/1994 |
| JP | 6-140976 A | 5/1994 |
| JP | 07-087011 | 3/1995 |
| JP | 7-307609 A | 11/1995 |
| JP | 9-214413 A | 8/1997 |
| JP | 9-238113 A | 9/1997 |
| KR | 1997-0013687 | 3/1997 |
| WO | WO 92/00632 A2 | 1/1992 |
| WO | WO 95/31070 | 11/1995 |

OTHER PUBLICATIONS

Firth, "Catv to Broadcast on 12 GHz," Electronic Times (Oct. 1991), London, England.

Beech et al., "Field Trails of MVDS in the 12 GHz Band," IEE Colloquim on 'MVDS: Microwave Video Distribution Systems' (Jan. 30, 1990), Digest No. 23, London, England, 13 pgs.

Feeney et al., "Can NM-Wave MVDS be Low Cost?" IEEE Colloquim on 'MVDS: Microwave Video Distribution Systems' (Jan. 30,1990), Digest No. 23, London, England; 5 pgs.

Hope, "Microwave television," Electronics & Wireless World (Aug. 1989) Sutton Surrey, England, pp. 780-782.

Hope, "MVDS," International Broadcast Engineer (May 1989), vol. 20, No. 230, England, pp. 102-105.

Hope, "Microwave Television-The Options," IEE Colloquim on 'MVDS: Microwave Video Distribution Systems' (Jan. 30, 1990), Digest No. 23, London, England, pp. 6/1-9.

Williams, "A 12 GHz MVDS Propagation Trial in the Coventry Urban Area," IEE Colloquim on 'MVDS: Microwave Video Distribution Systems' (Jan. 30, 1990), Digest No. 23, London, England, 7 pgs.

Author Unknown, "Frequency Range 29.7 MHz to 105 GHz and Associated European Table of Frequency Allocations and Utilisations," ERC Report 25 (Feb. 1998), 101 pgs.

Author Unknown, "Sharing the Band 11.7 GHz-12.5 GHz between ENG/OB and Direct-to-Home TV Broadcasting Satellite," ERC Report 37 (Oct. 1995), 10 pgs.

Author Unknown, "Point-to-Multipoint Systems Used in the Fixed Service," Recommendation ITU-R F.755-1 (1992-1994), 9 pgs.

Thil, "Le cable . . . sans câble!" Technologies International, No. 18 (Oct. 18, 1995), pp. 37-40.

Brindley, "The smallest dish on Earth," What Satellite (Aug. 1992), 2 pgs.

Author Unknown, "Propaganation Date Required for the Evaluation of Interference Between Stations in Space and Those on the Surface of the Earth," Recommendation ITU-R P.619-1 (1986-1990-1992), 5 pgs.

Author Unknown, "Frequency Sharing and Coordination Between Systemns in the Fixed-Satellite Service and Radio-Relay Systems," ITU, Recommendations of the CCIR (1990), vols. IV & IX—Part 2.

ERC Decision on the harmonised frequency band to be designated for the introduction of the MVDS, (Mar. 7, 1996), 5 pgs.

Author Unknown, "Propagation Data and Prediction Methods Required for the Design of Earth-Space Telecommunication Systems," Recommendation ITU-R P.618.6; (1986-1990-1992-1994-1995-1997-1999); 21 pgs.

Author Unknown, "Propagation Data Required for the Design of Earth-Space Land Mobile Telecommunication Systems," Recommendation ITU-R P.681-4 (1990-1994-1995-1997-1999), 16 pgs.

Author Unknown, "Characteristics of Precipitation of Propagation Modelling," Recommendation ITU-R P.837-3 (1992-1994-1999-2001), 8 pgs.

Author Unknown, "IEEE Standard Test Procedures for Antennas," The Institute of Electrical & Electronics Engineers, Inc., (Dec. 19, 1979).

Collins, "Primer on Frequency Coordination Procedures," National Spectrum Mgrs. Assoc. (htt://www.nsma.org/primer.html), Issue 1 (Mar. 27, 1989), 20 pgs.

Author Unknown, "Terrestrial Interference in the DBS Downlink Band," DIRECTV, Inc., El Sugundo, CA (Apr. 11, 1994), 33 pgs.

Parenti, "The First Transmissions in MMDS," Cinescopio, Italy (Oct. 15, 1992), vol. 9, 7 pgs.

Lundgren et al., "Radio-Relay Antenna Pointing for Controlled interference with Geostationary Satellites," The Bell System Technical Journal, vol. 48, No. 10, Madison, WI (Dec. 1969), pp. 3387-3422.

Gould, "Geostationary Orbit Avoidance Computer Program," FCC Report #CC-7201, Washington, D.C. (Sep. 1972), 85 pgs.

Author Unknown, "Mutual Exposures of the Antennae of Radio-Relay Systems to Emissions from Communication Satellites," Int'l Radio Consultative Committee, XIITH Plenary Assembly, Symposium, vol. IV, Part I, ITU, Geneva (1970), pp. 310-325.

Rand Corp. Technology Potentials for Satellite Spacing and Frequency Sharing (1968).

Eur. Radiocom. Comm., Sharing the Band 11.7 GHz Between ENG/OB and Direct-to-home TV Broadcast Satellite (ERC Rep. No. 37) (1995).

ITU Radio Regs., Article 27 (1982).

Scheeren, Interference-Reduction Techniques for Earth Stations (1988).

Hult, Sharing the UHF Between Space and Terrestrial Services (1970).

Author Unknown, "Propagation Data and Prediction Methods Required for the Design of Terrestrial Line-of-Sight Systems," Recommendation ITU-R P.530-6 (1978-1982-1986-1990-1992-1994-1995), 19 pgs.

Judge Cohn, US Court of Appeals for the Federal Circuit Decision, *Northpoint* v *MDS*, (Jun. 28, 2005), 34 pgs.
Losee et al., "Coexistence of Celestial and Terrestrial Communications," IRE Transactions on Communications Systems, vol. 9, Issue 4 (Dec. 1961), 3 pages.
Canadian IP Office, Office Action (Jan. 31, 2008), 6 pages.
Canadian IP Office, Office Action (Mar. 2, 2006), 2 pages.
KIPO, Notice to File a Response for Korean patent application No. 10-2000-7006618, dated Mar. 29, 2002 (4 pages).
KIPO, Notice to File a Response for Korean patent application No. 10-2000-7006618, dated Dec. 30, 2002 (3 pages).
JPO, Preliminary Notice of Reasons for Rejection for Japanese patent application No. 10-518435, dated Oct. 12, 2004 (5 pages).
JPO, Preliminary Notice of Reasons for Rejection for Japanese patent application No. 2000-539603, dated May 9, 2006 (51 pages).
PCT, International Search Report for PCT application No. PCT/US98/26655, dated Mar. 16, 1999 (3 pages).
PCT, Written Opinion for PCT application No. PCT/US98/26655, dated Sep. 10, 1999 (6 pages).
CPO, First Office Action for Chinese application No. 98812266.9, dated Jul. 4, 2003 (9 pages).
EPO, Supplementary European Search Report for European application No. 98962118.0, dated Nov. 15, 2001 (3 pages).
EPO, Communication pursuant to Article 96(2) EPC for European application No. 98962118.0, dated Feb. 10, 2004 (8 pages).
EPO, Communication pursuant to Article 96(2) EPC for European application No. 98962118.0, dated Dec. 20, 2005 (5 pages).
Intellectual Property Office of New Zealand, Examination Report for New Zealand application No. 506724, dated Sep. 7, 2000 (3 pages).
BPTO, Official Action for Brazilian application No. 9815180-0, dated Mar. 25, 2009 (7 pages).
CIPO, Office Action for Canadian application No. 2,314,960, dated May 17, 2007 (3 pages).
RPO, Examination Report for Russian application No. 2000119617, dated Mar. 4, 2002 (8 pages).
RPO, Examiner's Inquiry for Russian application No. 99109041 dated Oct. 12, 2001 (7 pages).
MXPO, Office Action for Mexican application No. 005953, dated Oct. 28, 2003 (3 pages).
Intellectual Property Office of New Zealand, Examination Report for New Zealand application No. 335562, dated Sep. 8, 1999 (2 pages).
Intellectual Property Office of New Zealand, Examination Report for New Zealand application No. 335562, dated Feb. 14, 2000 (2 pages).
PCT, International Search Report for PCT application No. PCT/US97/18219, dated Jun. 15, 1998 (4 pages).
PCT, International Preliminary Examination Report for PCT application No. PCT/US97/18219, dated Oct. 15, 1998 (4 pages).
PCT, International Search Report for PCT application No. PCT/US95/04141, dated Aug. 7, 1995 (1 page).

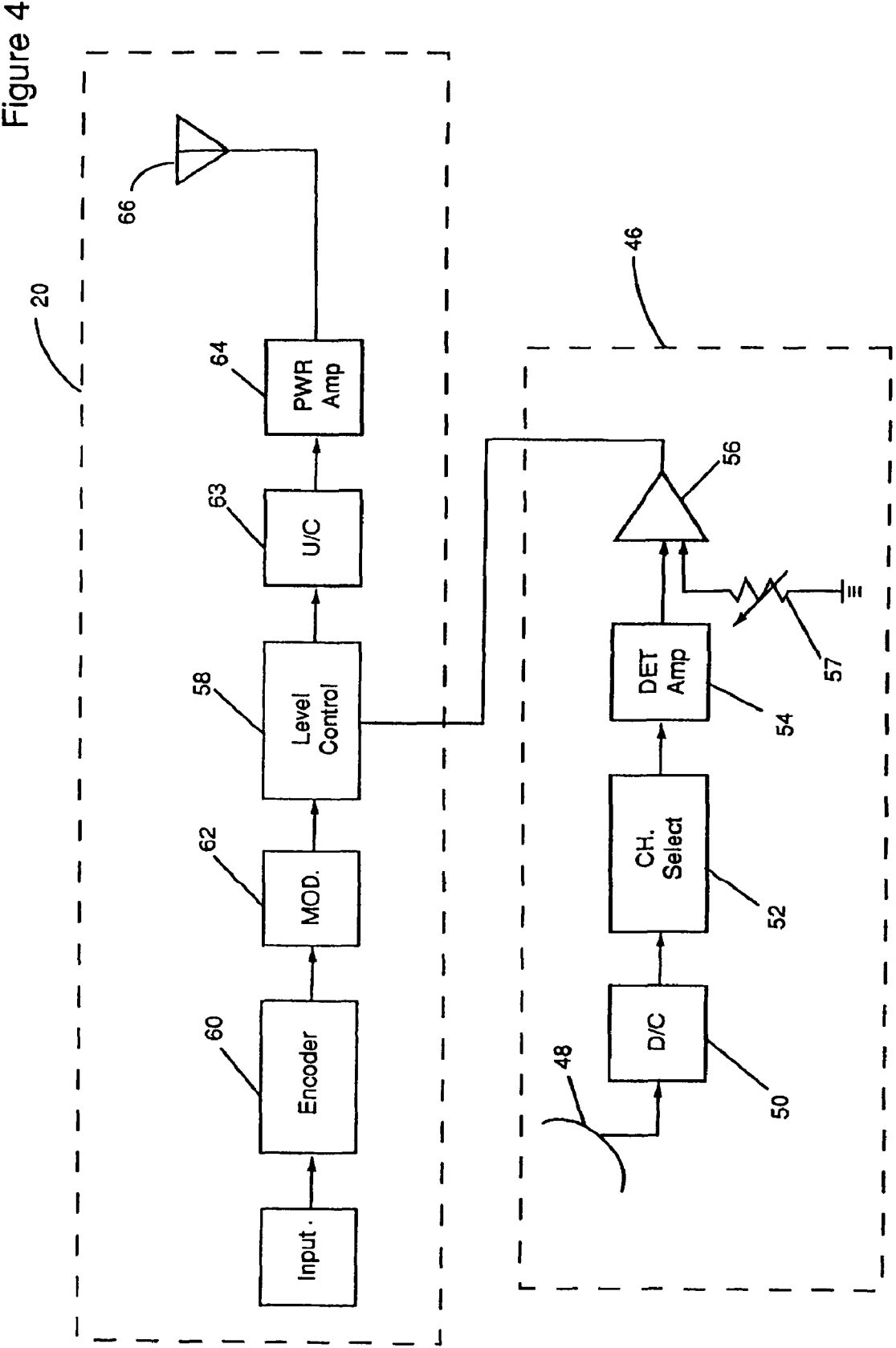

APPARATUS AND METHOD FOR REUSING SATELLITE BROADCAST SPECTRUM FOR TERRESTRIALLY BROADCAST SIGNALS

CROSS-REFERENCE TO RELATED APPLICATIONS

This application is a continuation of application Ser. No. 10/353,376 filed Jan. 29, 2003, now U.S. Pat. No. 6,983,123, which is a continuation of application Ser. No. 09/791,470 filed Feb. 23, 2001, now U.S. Pat. No. 6,519,446 which is a continuation of application Ser. No. 09/001,766 filed Dec. 31, 1997, now U.S. Pat. No. 6,208,834 which is a continuation-in-part of application Ser. No. 08/731,244 filed Oct. 11, 1996, now U.S. Pat. No. 5,761,605. The entire content of each of these prior applications is incorporated herein by this reference.

TECHNICAL FIELD OF THE INVENTION

This invention relates to apparatus and methods for broadcasting and receiving data, including digital television signals, voice signals, and other data. More particularly, this invention relates to an apparatus and method for providing terrestrial transmissions simultaneously along with direct broadcast satellite transmissions on a common frequency.

BACKGROUND OF THE INVENTION

Television signals may be received from a satellite in geosynchronous orbit about the earth. The television signals are transmitted from a terrestrial transmitter to the satellite, perhaps communicated between different satellites, and then retransmitted from a satellite so that the signals can be received by terrestrial receivers within a certain geographic receiving area within a line of sight of the satellite. In addition to television signals, other types of data may also be transmitted to consumers through satellites in either geosynchronous or non-geosynchronous orbit.

Direct broadcast satellite service (DBS) refers to satellite transmission of television signals and other data directly for use by individual households or subscribers having the proper signal receiving equipment. The U.S. Federal Communications Commission has dedicated the electromagnetic spectrum from 12.2 gigahertz to 12.7 gigahertz for DBS broadcasting. Numerous signal carriers are located within the DBS spectrum, each carrier carrying data for several individual television channels. Depending upon the compression technology applied to these signals, literally hundreds of separate television channels may be available through DBS. A great benefit of the DBS system as opposed to prior satellite systems is that only a small dish-type antenna is required to receive the DBS signals and the alignment of the receiving dish is not as critical as earlier satellite broadcast systems. Also, the DBS system can provide high quality reception at any point in the geographic receiving area of a satellite without the expense of land transmission lines such as those required for cable television.

Current regulations require that DBS satellites be separated from each other by at least nine (9) degrees in a geosynchronous arc. The receiving antenna for DBS signals must, therefore, be limited to receiving signals in a directional range measuring plus or minus nine (9) degrees from a centerline of the antenna. Receiving signals in a range wider than the satellite spacing would cause interference by signals transmitted by different satellites on the same frequency. The limited directional reception range of the DBS receiving antenna is the result of the gain provided by the antenna being asymmetrical about the antenna structure. DBS signals reaching the DBS receiving antenna at angles outside of the directional range of the antenna receive insufficient gain to interfere with the desired DBS signals received within the antenna directional range.

U.S. Pat. No. 5,483,663 is directed to a system having a receiver arrangement in which DBS and terrestrial signals are received within similar frequency bands. The system shown in the U.S. Pat. No. 5,483,663 patent may be implemented with a multiple antenna arrangement, or with a single, moveable antenna. In the multiple antenna arrangement, two separate antennas direct the received signals to a common propagation path for processing as if they were received by a single antenna and transmitted from a single location. In the single antenna arrangement, the antenna is movable between a position to receive DBS signals and another position to receive terrestrial signals.

The advantage of the system shown in U.S. Pat. No. 5,483,663 is that local originating signals, whether carrying data for television or other data, may be received simultaneously with DBS signals, and processed with the same or similar equipment as that used to process the DBS signals. The local originating signals may carry local television programming which may be received along with the national or regional DBS television programming.

SUMMARY OF THE INVENTION

The present invention provides terrestrially transmitted signals simultaneously with satellite transmitted signals at the same frequency. The invention includes both apparatus and methods for transmitting terrestrial signals simultaneously with satellite signals transmitted at a common frequency.

According to the present invention, terrestrial signals are transmitted in a manner which ensures that they do not interfere with satellite signals transmitted at the same frequency. Embodiments of the invention may take advantage of receiving antennae having a limited directional reception range or satellite receiving window and may include transmitting the terrestrial signals in a different range of directions than those in which the satellite signals are transmitted. The power level at which the terrestrial signals are transmitted and the directional nature of the satellite receiving antennae ensure that the satellite transmitted signals can be discriminated from the terrestrially transmitted signals. Although the terrestrial signal transmission power is limited to a non-interfering transmission power level, the terrestrial transmission is still strong enough to produce a usable signal at a location distant from the source of the terrestrial transmission.

Several different signals will be discussed in this disclosure. The term "satellite signals" refers to signals transmitted directly from a satellite, whereas the term "terrestrial signals" refers to signals transmitted directly from a terrestrial transmitter. "Satellite input signals" refers to signals resulting from satellite signals which have been picked up by an antenna and subjected to gain provided by the antenna. Finally, "terrestrial input signals" refers to signals resulting from terrestrial signals which have been picked up by an antenna and subjected to gain provided by the antenna.

The invention is employed in the situation in which satellite signals are transmitted at a satellite transmission frequency to a terrestrial location. The satellite signals travel along a satellite signal route from the satellite to the terrestrial location and to a satellite receiving antenna at the location for receiving the satellite signals. In some embodiments of the invention, the satellite receiving antenna is omni-directional, that is, provides generally the same gain regardless of the direction from which the signals reach the antenna. In other forms of the invention, the satellite receiving antenna has a directional reception characteristic in which the antenna provides higher gain for satellite signals received within an antenna look angle or satellite receiving window.

The omni-directional satellite receiving antenna need not be oriented in a particular direction to receive signals from a satellite. However, in order to receive satellite signals with the directional satellite receiving antenna, the antenna must be aligned in a satellite reception position. In this satellite reception position, the satellite signal route, that is, the route taken from the satellite to the directional satellite receiving antenna, lies within the satellite receiving window of the satellite receiving antenna. The satellite signals thus receive sufficient gain from the antenna structure to produce satellite input signals which are at least at a usable input signal level. This minimum usable input signal level represents the minimum input signal level at which the receiving or signal processing equipment can extract the desired data.

According to the invention, the terrestrial signals are transmitted at the same frequency as the satellite signals. The terrestrial signals are transmitted along a wireless route from the terrestrial transmitter to a user location which may have a satellite receiving antenna. The invention avoids interference between the terrestrial and satellite signals by ensuring that the power level, that is, signal strength, of the terrestrial input signals at the satellite receiving antenna is below an interference level with respect to the satellite input signals at the satellite receiving antenna. The interference level is an input signal power level which is so close to the satellite input signal power level that the satellite input signals cannot be discriminated or distinguished. Terrestrial input signals below the interference level do not prevent the receiving or signal processing equipment associated with the satellite receiving antenna from distinguishing and extracting data from the satellite input signals. Also according to the invention, although the terrestrial signals are transmitted so that they do not interfere with the satellite signals, the terrestrial signals present at the user location must be strong enough so that they may be received by an appropriately aligned terrestrial receiving antenna at the location, and distinguished from satellite input signals at the terrestrial receiving antenna. That is, the terrestrial signals present at the location must be at least at a minimum usable terrestrial signal level.

Where the satellite receiving antenna is omni-directional, both the satellite signals and the terrestrial signals picked up by the antenna receive substantially the same gain. Thus, for omni-directional satellite receiving antennae, the terrestrial transmission power level must be controlled so that the terrestrial signals present at the user location have a sufficiently lower power level than the satellite signals present at the user location.

Where the satellite receiving antenna at the user location is a directional antenna, the invention may take advantage of the directional characteristic of the antenna and may transmit terrestrial signals at a higher power level while still producing a terrestrial input signal at the satellite receiving antenna which is below the interference level. In the case of the directional satellite receiving antenna, the antenna is oriented in the satellite reception position at the user location. The terrestrial transmitter is located with respect to the user location such that the wireless transmission route or path from the terrestrial transmitter to the user location is outside of the satellite signal receiving window of any satellite receiving antenna located at the user location and oriented in the satellite reception position. Being outside the satellite signal receiving window, the terrestrial signals receive much less gain than the satellite signals. Thus, the terrestrial signal power level at the user location may be the same as or even higher than the satellite signal level and, due to the different gain applied to the signals by the antenna structure, still result in a terrestrial input signal having a power level below the interference level with respect to the satellite input signal level.

In some applications of the invention, depending upon the direction at which a directional satellite receiving antenna must be directed to receive satellite signals, the terrestrial transmissions may be limited to a certain azimuth range. This terrestrial transmission azimuth range is limited so that it does not include any directions that are within the satellite reception look angle or satellite receiving window of a directional satellite receiving antenna aligned to receive signals from a particular satellite. In order to cover a large geographic service area for terrestrial signal reception while maintaining the terrestrial transmission power at a non-interfering level, a plurality of terrestrial transmitters may be spaced apart over the area. In this case, the effective transmission areas of the different terrestrial transmitters combine to ensure the terrestrial signals may be received clearly at each location within the desired geographic service area.

The satellite transmissions and terrestrial transmissions may contain or carry any type of data including television, internet communications, voice, video, or any other type of data. Although the invention is not limited to any particular transmission frequencies, the invention is particularly well adapted for transmission frequencies above one thousand (1000) megahertz. Also, although the invention is not limited for use with a particular transmission modulation technique, modulation techniques such as phase modulation and spectrum spreading (frequency hopping) are currently preferred.

These and other advantages and features of the invention will be apparent from the following description of preferred embodiments, considered along with the accompanying drawings.

BRIEF DESCRIPTION OF THE DRAWINGS

FIG. 4 is a schematic representation of a terrestrial transmitter and terrestrial transmission power control arrangement embodying the principles of the invention.

DESCRIPTION OF PREFERRED EMBODIMENTS

Figure 1:
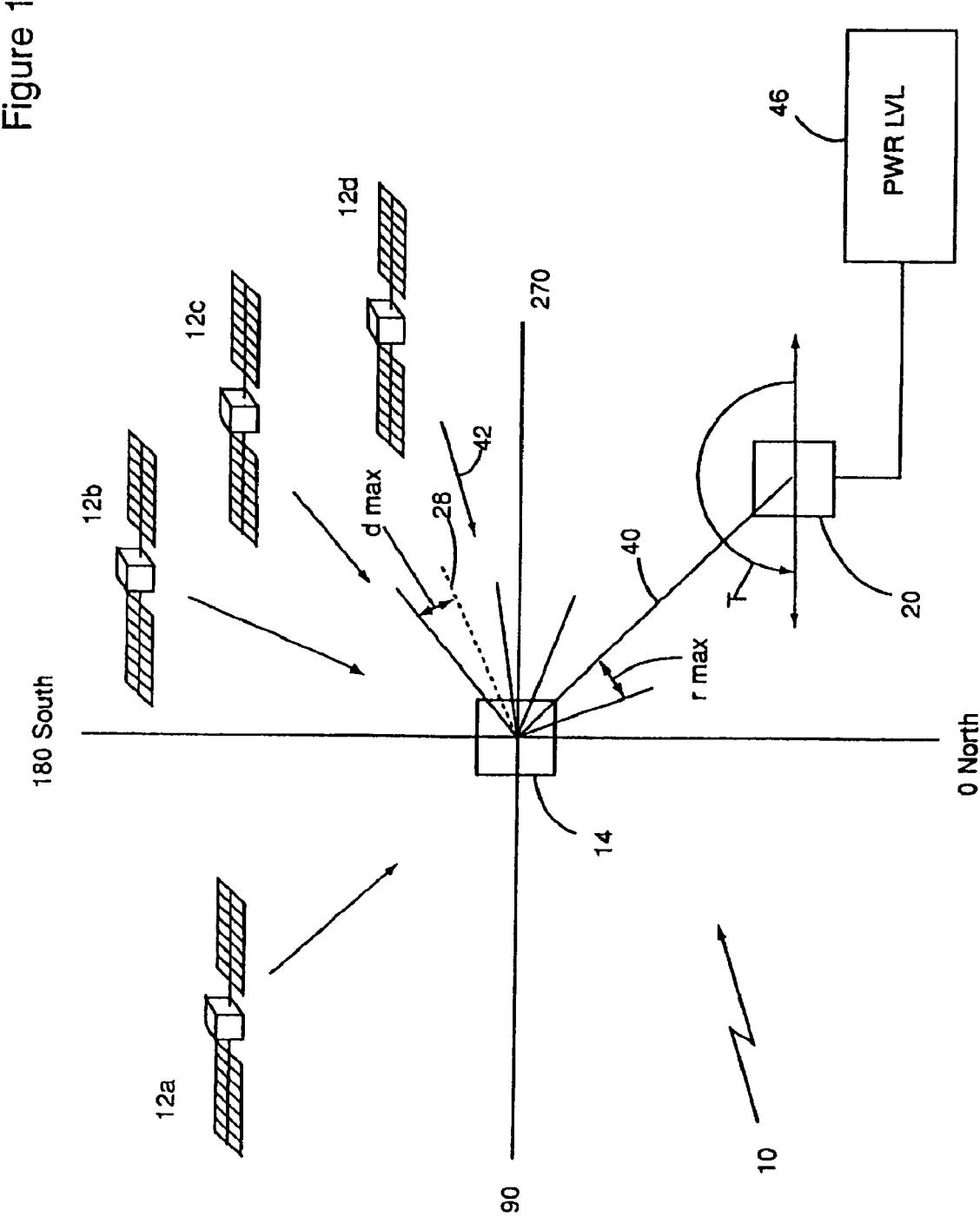
FIG. 1 is a schematic representation showing the positions of a plurality of satellites in relation to a single terrestrial transmitter and a receiver or user location.
Figure 2:
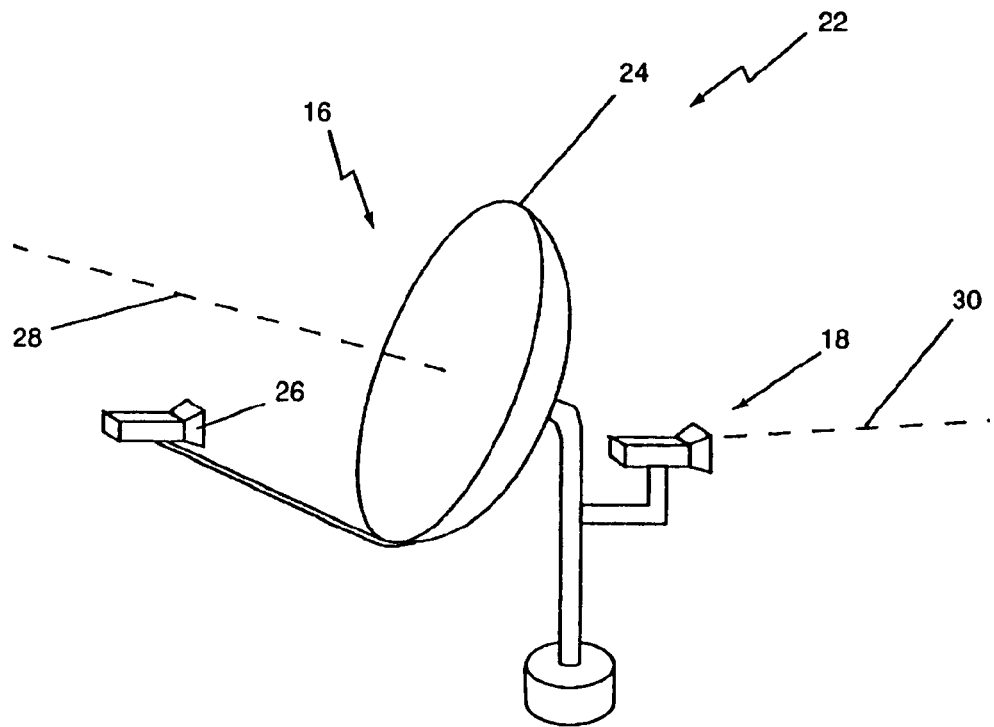
FIG. 2 is a somewhat schematic representation of a receiving antenna structure for receiving satellite and terrestrial transmitted signals at a common frequency.

An apparatus according to the invention for providing terrestrially transmitted signals simultaneously on the same frequency used to transmit satellite signals is illustrated in FIG. 1. As shown in FIG. 1, there may be one or more satellites in orbit about the earth. FIG. 1 shows four satellites 12a, 12b, 12c, and 12d spaced apart at four separate directions from a user location 14. A satellite receiving antenna and a terrestrial receiving antenna may be located at user location 14. An example of a satellite receiving antenna that may be located at the user location 14 in FIG. 1 to receive satellite signals is shown in FIG. 2 at reference numeral 16 and will be described in detail with reference to that figure. FIG. 2 also shows an example of a terrestrial receiving antenna 18 that may be employed at user location 14 in FIG. 1.

Referring to FIG. 1, each of the satellites 12a-d is positioned in geosynchronous orbit about the center of the earth, and is positioned at a certain longitude and latitude above the earth's surface. In geosynchronous orbit, each satellite remains at a fixed location with respect to the earth's surface, and thus, with respect to user location 14. As is known by those skilled in the art, a directional receiving antenna may be directed at a certain elevation and direction or azimuth toward a desired satellite location for receiving signals from the particular satellite. Of course, the satellite signals may be transmitted from satellites that are not in geosynchronous orbit. In this non-geosynchronous orbit case, the directional satellite receiving antenna can receive satellite signals only as the particular satellite passes through the satellite receiving window or look angle of the satellite receiving antenna, or the antenna must be moved or otherwise manipulated to track the satellite in non-geosynchronous orbit.

Currently, all direct broadcast satellites within the line of sight of North America are positioned at longitudes and latitudes requiring a directional receiving antenna to face in a southerly direction from North America to receive signals. Although FIG. 1 shows four satellites 12a-d for purposes of describing the invention, more or fewer satellites may be spaced apart within a line of sight of a certain geographical area. Regardless of the number of satellites, a directional satellite receiving antenna at a user location such as location 14 must be directed at a particular azimuth and elevation to receive signals from a particular satellite. The term "azimuth" refers to the direction of the antenna with respect to a reference direction such as due north, commonly zero degrees. "Elevation" refers to the angle of the antenna with respect to horizontal.

In contrast to directional receiving antennae, omni-directional antennae need not be oriented in any particular direction in order to receive signals. Thus, an omni-directional antenna at user location 14 would receive signals equally well from each of the satellites 12a-d.

Different DBS satellites transmit different signals in the same frequency band allocated for direct satellite signal transmission from each satellite to the given geographic service area. The U.S. Federal Communications Commission has allocated the electromagnetic spectrum from 12.2 gigahertz to 12.7 gigahertz for DBS broadcasting. In order to ensure no interference from signals between two adjacent satellites transmitting at the same frequency, two conditions must be met. First, the satellite receiving antenna must be a directional antenna and limited to receive signals at the DBS signal strength only within a certain reception range about the centerline of the antenna, that is, within a limited satellite signal receiving window. Second, the satellites must be spaced apart so that a receiving antenna may be positioned with only a single satellite transmitting in the directional reception range, that is, look angle or satellite signal receiving window of the satellite receiving antenna.

According to current regulations, individual DBS satellites must be separated at least nine (9) degrees in the geosynchronous arc. Thus, each DBS receiving antenna must have a directional reception range, look angle, satellite signal receiving window, or aperture of plus or minus nine (9) degrees or less as measured from a centerline of the antenna. Although current regulations require a spacing of no less than nine (9) degrees separation, the invention is not limited to use in situations in which the satellites have this degree of separation. The invention is also not limited to use in situations in which the satellites operate in the current DBS frequencies.

FIG. 1 also shows a terrestrial transmitter 20 capable of transmitting in one or more frequencies identical to a frequency transmitted by one of the satellites 12a-d. The terrestrial transmitter 20 transmits directionally within a certain transmission range or azimuth range T. The transmission range T shown in FIG. 1 is 180 degrees, although the range may be more or less than this number. In some situations, the transmission range may not be limited but may encompass the entire 360 degrees around the transmitter location.

A combined receiving antenna structure 22 which may be at the user location 14 in FIG. 1 is illustrated in FIG. 2. This combined receiving antenna structure 22 includes satellite receiving antenna 16 designed to receive direct broadcast satellite signals. The illustrated satellite receiving antenna 16 includes a collecting dish 24 and a feed-horn assembly 26 for receiving the signals reflected and concentrated by the dish. Those skilled in the art will readily appreciate that the feed-horn assembly 26 includes a probe and low noise block converter, which are not shown in FIG. 2, for picking up signals directed to antenna 16. The received signals, which are defined herein as "input signals," are directed from the antenna 16 to receiving or signal processing equipment, also not shown, for extracting information or data. This signal processing equipment is well known in the art and does not form a part of this invention. Also, those skilled in the art will appreciate that numerous types of assemblies may be used alternatively to the feed-horn assembly 26 for collecting signals reflected by the dish 24. Furthermore, many other types of antennae may be used for receiving the satellite signals.

Satellite receiving antenna 16 is a directional antenna and thus has the characteristic that the signal gain produced by the antenna is highly dependent upon the direction at which the signals reach the antenna. Antenna 16 produces a maximum gain for signals traveling to the structure along an antenna centerline 28. For signals traveling to satellite receiving antenna 16 along a route which is at an angle to the centerline 28, the antenna provides less gain. For the dish-type antenna 16 shown in FIG. 2, the antenna gain decreases as the angle to the centerline 28 increases up to a certain angle on either side of the centerline. At angles outside of this certain angle, the gain may remain fairly constant. It will be understood that the angle from the centerline 28 may be in the horizontal direction, vertical direction, or both.

As the antenna gain decreases with the increased angle from the centerline 28, an angle is reached at which the antenna gain is insufficient to develop a usable satellite input signal from the antenna 16 for a particular satellite transmission. The maximum reception angle at which an antenna such as antenna 16 will develop a usable signal is shown as d max in FIG. 1. This angle d max defines a cone-shaped area about centerline 28 which is commonly referred to as the "look angle" or "aperture" of the antenna and may also be referred to herein as the satellite receiving window for the antenna. Satellite signals at the designated power level propagating to an antenna such as antenna 16 at an angle greater than d max to antenna centerline 28 (that is, propagating to the antenna along a route outside of the satellite signal receiving window) result in input signals from the antenna less than the minimum usable input signal level. Input signals below the minimum usable input signal level cannot be distinguished from background signals or noise, and the signal processing equipment that receives the input signals cannot extract data from signals at these low signal levels. The minimum usable input signal level is determined by many factors including the bandwidth of the transmissions, the antenna structure, and the signal processing equipment that receives the signals developed by the antenna structure.

Referring to FIG. 1, a satellite receiving antenna such as antenna 16 which may be at location 14 is shown for purposes of example as being in a satellite reception position with respect to satellite 12d and thus is directed to receive signals from that satellite. The satellite signals from satellite 12d travel along a satellite signal path to location 14. The azimuth and elevation at which the antenna must be directed for optimally receiving signals from satellite 12d may be, for example, 247.3 degrees and 25.7 degrees, respectively.

In the orientation shown in FIG. 1, the satellite receiving antenna at location 14 cannot receive signals from the terrestrial transmitter 20 in the presence of satellite signals at the same frequency. Two factors combine to prevent interference between the satellite and terrestrial signals. First, signals transmitted from the terrestrial transmitter 20 travel along a wireless transmission route or path 40 to location 14 which lies outside of the look angle, that is, the aperture or satellite signal receiving window (shown about centerline 28 in FIG. 1) of the satellite receiving antenna. Thus, the terrestrial signals receive relatively low gain from a satellite receiving antenna (such as antenna 16) oriented to receive signals from satellite 12d as compared to the satellite signals traveling along a satellite signal route 42 within the look angle, that is, the aperture or receiving window of the antenna. Second, the terrestrial transmission power level is controlled according to the invention such that terrestrial signals at location 14, with the low gain provided by a satellite receiving antenna such as antenna 16 for signals traveling along wireless transmission route 40, result in terrestrial input signals from the satellite receiving antenna which are below the interference level with respect to the satellite input signals from the antenna. Thus, even though the terrestrial signals may actually be picked up by a satellite receiving antenna at user location 14 and produce terrestrial input signals from the antenna, the satellite input signals are in comparison strong enough for the signal processing equipment (not shown) associated with the antenna to discriminate between the satellite input signals and terrestrial input signals. The interference level will depend on several factors including primarily the signal processing equipment and, with present technology, may be in the range of 3 dB to 5 dB below the level of the satellite input signals.

Although the direction of the terrestrial transmissions along wireless route 40 and the terrestrial signal power level combine to prevent the terrestrial signals from interfering with the satellite signals at the same frequency, the power level of the terrestrial transmissions is still sufficient to produce a usable signal at location 14. In order to receive and use terrestrial signals at the location, a terrestrial receiving antenna such as antenna 18 shown in FIG. 2 is required. The terrestrial receiving antenna 18 has a directional gain characteristic similar to satellite receiving antenna 16 to ensure that the terrestrial signals produce an input which may be discriminated from the input produced by the satellite signals at the terrestrial antenna. For example, a terrestrial receiving antenna such as antenna 18 at location 14 could have its centerline 30 aligned directly with the wireless transmission route 40 from terrestrial transmitter 20. The look angle, that is, the aperture, of a terrestrial receiving antenna at user location 14 comprises the cone-shaped area defined by the angle r max about centerline 30 in FIG. 1. At this orientation, the satellite signals are well outside the look angle of a terrestrial receiving antenna such as antenna 18 and receive much lower gain as compared to the terrestrial signals. The terrestrial signals at location 14 are strong enough that, with the help of the gain provided by a terrestrial receiving antenna such as antenna 18, they result in terrestrial input signals that may be discriminated from any input signals at the terrestrial receiving antenna resulting from the satellite signals. With present technology, the terrestrial input signals from the terrestrial receiving antenna may be 3 dB to 5 dB or more above the power level of the satellite input signals from the terrestrial receiving antenna in order for the terrestrial input signals to be discriminated. Thus, the terrestrial transmission apparatus and method according to the invention allows satellite and terrestrial signals carrying entirely different information or data to be received and used simultaneously at user location 14.

The ability to transmit terrestrial signals at the same frequency as satellite signals without interference between the signals presents an opportunity for terrestrial reuse of spectrum previously reserved exclusively for satellite transmissions. Furthermore, since the terrestrial transmitter according to the invention has a limited effective transmission range, the spectrum reused for the terrestrial transmissions may also be reused for terrestrial transmissions in many different geographic areas.

It will be understood that terrestrial receiving antenna 18 is not necessarily an element of the present invention. The terrestrial receiving antenna 18 is disclosed and discussed herein only for the purpose of emphasizing the utility of the terrestrial transmitting apparatus and method according to the invention. Satellite receiving antenna 16 is also not necessarily an element of the invention. Rather, satellite receiving antenna 16 is discussed herein for the purpose of describing the manner and direction in which terrestrial signals must be transmitted according to the invention. In any case, the satellite and terrestrial receiving antennae which may be at any user location 14 need not be combined into a single structure. The combined structure 22 shown in FIG. 2 is shown for convenience in describing the terrestrial transmission invention disclosed herein.

In the case of an omni-directional satellite receiving antenna, the antenna has no centerline such as centerline 28 shown in FIGS. 1 and 2, and no look angle or directional reception range. Rather, the gain provided by the antenna is substantially independent of the direction from which the signals reach the antenna. In that case, the method of the invention includes transmitting terrestrial signals at the first frequency similarly to the case described above in which the satellite receiving antenna is a directional antenna. However, the direction at which the terrestrial signals are transmitted cannot be relied upon to produce terrestrial input signals below the interference level with respect to the satellite input signals received at the omni-directional satellite receiving antenna. Rather, for the omni-directional satellite receiving antenna, the terrestrial transmission power level is controlled so that the terrestrial signals present at the user location are below the interference level with respect to the satellite signals at the user location. Since the omni-directional antenna provides the same gain to both the terrestrial and satellite signals, this signal level present at the satellite receiving antenna location ensures that the terrestrial input signals are below the interference level with respect to the satellite input signals.

Figure 3:
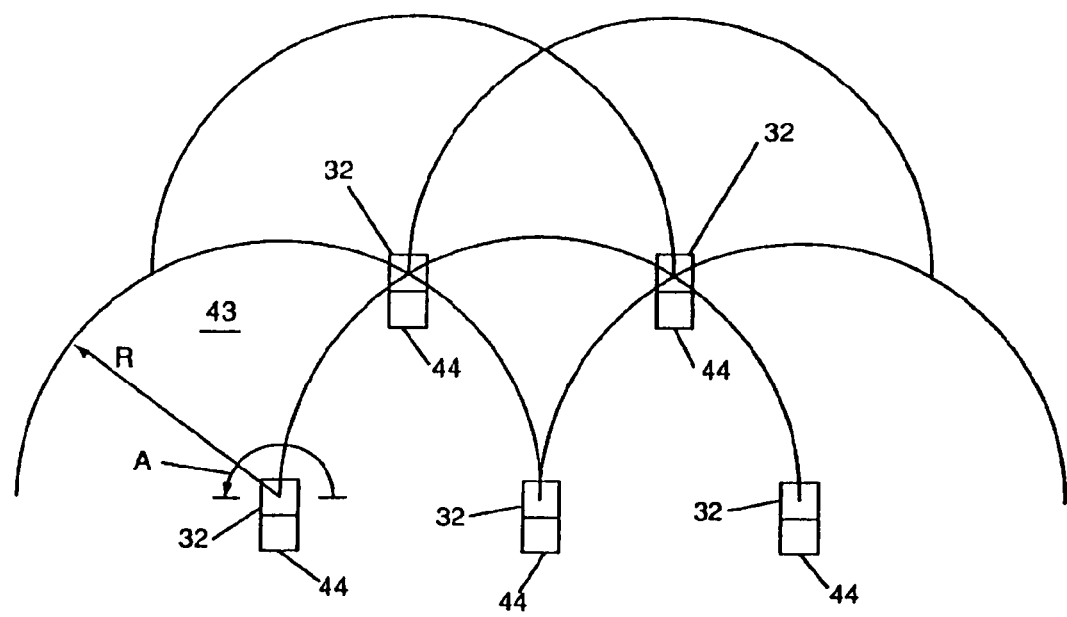
FIG. 3 is a schematic representation of the spacing for a number of terrestrial transmitters required to allow reception and use of terrestrial signals over a large geographic area.

Referring to FIG. 3, a plurality of terrestrial transmitters 32 may be required to provide terrestrial signals strong enough to be received over a large area, but low enough to prevent interference with satellite signals at the same frequency. Each transmitter 32 in FIG. 3 transmits directionally in an azimuth range A of approximately 180 degrees and out to an effective reception range R. Thus, each transmitter 32 transmits to an effective transmission area 43. With this transmitter spacing and transmission range, the signals from the terrestrial transmitters 32 may be received from any location within the geographic service area comprising the combined effective transmission areas of the several terrestrial transmitters 32. Although the directional range of 180 degrees is shown for purposes of example, the terrestrial transmissions may be in other ranges within the scope of this invention. In each case, however, the terrestrial transmissions from each transmitter 32 are in directions that are outside of the satellite receiving antenna look angle, that is, the aperture or satellite signal receiving window for an antenna in a satellite reception position at any location within the geographic service area (combined areas 43), in the case where the satellite transmissions and the terrestrial transmissions are at the same frequency. With the terrestrial signal power limitation according to the invention, the terrestrial signals do not interfere with the satellite signals transmitted at the same frequency to that geographic service area.

In another aspect of the invention, the user location itself may include a transmitter for directionally transmitting at a satellite frequency. Such transmission capability from the user location would allow wireless communication both to and from the user location. The transmissions from the user location would be limited so as to include no direction within the look angle of a nearby satellite receiving antenna and would be limited as to transmission power as discussed above with regard to other terrestrial transmissions.

In the multiple terrestrial transmitter application of the invention such as the arrangement depicted in FIG. 3, it may be desirable, although not necessary, for the signals from the several transmitters 32 to be synchronized. The synchronization in this sense means that each transmitter transmits the same data at the same frequency so that it may be received substantially simultaneously at a user location which lies within the effective transmission area (the area defined by radius R) of two or more different transmitters. Thus, regardless of which transmitter 32 to which a user may direct their terrestrial receiving antenna, the user receives substantially the very same data as any other user of terrestrial signals at that frequency in the geographic service area. The transmitters may have associated with them signal synchronization means 44 for enabling this synchronized transmission. Those skilled in the art will appreciate that several different arrangements may be used to provide such synchronization. For example, the signal synchronization means 44 may comprise high speed communications links such as optical fiber or high speed electrical communications links for communicating data to be transmitted or synchronization signals between transmitters 32. Alternatively the synchronization means 44 may comprise high gain antennae for relaying the received signals from one transmitter 32 to the next. Any such relaying antennae and high speed communication links are to be considered equivalent signal synchronization means according to the invention.

As discussed above, and referring again to FIG. 1, the power level at which the terrestrial signals may be transmitted must be limited to prevent interference with the satellite signals transmitted at the same frequency. However, the transmission power must still be strong enough to produce a usable signal level at a distant location, location 14 for example. The power level of the terrestrially transmitted signals is highest near the transmitter and decreases as the distance from the transmitter increases. Thus, the transmission power is limited by the maximum terrestrial signal level at the potential satellite signal user location which is nearest to the terrestrial transmitter 20. The maximum terrestrial signal level at the nearest satellite user location to the terrestrial transmitter is a signal that produces a terrestrial input signal at a satellite receiving antenna at that nearest location that is just below the interference level with respect to the satellite input signals that may be produced by the satellite receiving antenna at that location. The transmission power to produce signals of this strength at the nearest location to the terrestrial transmitter 20 represents the maximum allowable transmission power and determines the effective transmission range or area of the terrestrial transmitter. This maximum level and all transmission power levels below this maximum level are non-interfering power levels and produce non-interfering terrestrial input signals at any satellite receiving antenna in the effective transmission area of the terrestrial transmitter 20.

A certain area around the terrestrial transmitter may be designated an exclusion zone and the nearest location to the terrestrial transmitter may be defined as a location at the edge of the exclusion zone. In this case, the transmission power of the terrestrial transmitter is controlled so that the terrestrial signals are just below the interference power level at this "nearest location" at the edge of the exclusion zone. The terrestrial signal level at locations within the exclusion zone is at a level which could cause interference with satellite signals unless the satellite receiving antenna design is modified to increase the directionality of the antenna, that is, the difference between the gain provided to the satellite signals and the gain provided to the terrestrial signals.

It will be apparent that the maximum power level at which terrestrial signals may be transmitted in accordance with the invention is dependent in part upon the power level of the satellite signals at the various user locations. As shown in FIGS. 1 and 4, one preferred form of the invention includes a terrestrial transmission power control arrangement or means 46 for determining the power level of the satellite signals and for using that power level to set the power level of the terrestrial transmitter 20. Referring now to FIG. 4, the terrestrial transmission power level control means 46 may comprise a calibrated receiver or any other suitable device by which the satellite signal strength may be determined. The illustrated calibrated receiver includes a satellite receiving antenna 48, a down-converter 50, preferably a channel selector 52, and a detector amplifier 54. The illustrated calibrated receiver also includes a comparator 56 with a variable resistance device 57 connected to one comparator input. The other comparator input is connected to receive the signal from the detector amplifier 54. Comparator 56 has its output connected to a level control device 58 associated with the terrestrial transmitter 20.

The illustrated transmitter 20 includes an encoder 60 which receives and encodes an input for terrestrial transmission, and also includes a modulator 62 for providing the desired modulation for transmission. The level control device 58 is interposed between the modulator 62 and an up-converter 63 which converts the signals to the desired higher frequency for transmission. The converted signals are then amplified by the power amplifier 64 and directed to a transmitter antenna 66.

The power level control device 46 operates by continuously monitoring a satellite signal which, due to the particular satellite orientation and/or transmission power, is most susceptible to interference from the terrestrial transmitted signals. The satellite receiving antenna 48 is directed to receive the signal from that most susceptible satellite, and the received signal is down converted to an intermediate frequency by down converter 50.

The down converted signal may be processed by channel selector 52 to separate a single channel and this separated signal is then filtered and converted to a dc voltage signal by detector amplifier 54. This dc voltage signal is representative of the power level of the received satellite signal, and is compared to a reference signal by comparator 56. The reference signal is set by the variable resistance 57 initially so that the comparator output is zero. At this initial setting, the transmission power level of transmitter 20 is set at a maximum non-interfering power level. At this power level the terrestrial signals at the various locations beyond any exclusion zone around the transmitter 20 result in terrestrial input signals which are below the interfering power level with respect to any satellite input signals at the same frequency. However, as the signal power of the satellite signals received at the antenna 48 changes over time, the output of comparator 56 causes the level control 58 to change the transmission power of the terrestrial transmitter 20 accordingly. When the satellite signal becomes weaker than at initial conditions, the comparator 56 output is less than zero and this causes the level control 58 to reduce the transmission power from transmitter 20. When the satellite signal becomes stronger, the comparator 56 output returns toward zero and this causes the level control 58 to increase the transmission power to transmitter antenna 66.

The method of the invention may now be described with particular reference to FIGS. 1 and 2. A first frequency is assumed already in use for transmitting satellite signals from a satellite, satellite 12*d* for example, along the satellite signal 42 route or path to location 14. Satellite signals are received at the location 14 with a satellite receiving antenna such as antenna 16 shown in FIG. 2. Satellite receiving antenna 16 has a directional reception characteristic with a maximum gain along the antenna centerline 28 and lower gain at angles from the antenna centerline. The satellite receiving antenna is oriented in a satellite reception position in which the satellite signal route 42 is within an angle d max on either side of, or about, the centerline 28 of the antenna. The overall angle d max about centerline 28 defines a satellite signal receiving window in this illustrated embodiment of the invention. In this satellite reception position, the satellite signals produce a satellite input signal from the satellite receiving antenna and this input signal is at least at the minimum usable signal level for the particular signal processing equipment.

The method of the invention includes transmitting terrestrial signals at the first frequency, that is, the same frequency at which the satellite signals are transmitted. The terrestrial signals are transmitted in directions which include the wireless transmission route 40 from the transmitter 20 to location 14. According to the invention, the transmitter 20 is configured such that the wireless transmission route 40 lies at an angle to the satellite signal route to location 14, and this angle is sufficiently large and the terrestrial transmission power level is sufficiently low that the terrestrial signals present at location 14 produce terrestrial input signals which are below the interference level with respect to the satellite input signals produced at a satellite receiving antenna such as antenna 16 at the user location. The terrestrial signals present at location 14 are also at a power level at least at the minimum usable terrestrial signal level. At this minimum usable terrestrial signal level, the terrestrial signals may be picked up by a terrestrial antenna such as antenna 18 shown in FIG. 2 which may be at the user location 14. Terrestrial antenna 18 is a directional antenna to ensure that the satellite signals do not interfere with the terrestrial signals.

Under current technology, the satellite signal level at any terrestrial user location may range from −120 dBm to −125 dBm under clear sky conditions and from −122 dBm to −127 dBm under more adverse weather conditions. Depending primarily upon the directionality of the satellite receiving antenna and the capabilities of the signal processing equipment associated with the satellite receiving antenna, terrestrial signal power level at the user location must remain below about −95 dBm. This terrestrial signal power level assumes a satellite receiving antenna gain of approximately 34 dB for the satellite signals and a gain of about −2 dB for the terrestrial signals, and an interference level of approximately 4 dB below the satellite input signal power level. Also, under current technology, the terrestrial input signals must remain about 4.5 dB (3 dB to 5 dB) below the satellite input signals in order for the signal processing equipment to distinguish the satellite input signals and extract the desired data from the satellite input signals. Those skilled in the art will readily appreciate that the invention is not limited to these signal power values and that these values are provided for purposes of illustration and example.

Also according to the invention, the terrestrial transmitter 20 transmits only along wireless transmission routes that avoid interference with the satellite signals at any location within an effective transmission range of the terrestrial transmitter. That is, the wireless route 40 from the transmitter 20 to any location 14 is at an angle with respect to a properly aligned satellite receiving antenna at the respective location such that the terrestrial input signals from the satellite receiving antenna are always below the interference level with respect to the satellite input signals which may be produced from the satellite receiving antenna. To ensure the required terrestrial signal strength at any location, including those adjacent to the terrestrial transmission location, the method of the invention may also include monitoring the signal strength of the satellite signals and setting the terrestrial transmission power to the maximum non-interfering power level based upon that detected satellite signal strength.

Referring to FIG. 3, the method also includes transmitting from a second terrestrial transmitter 32 to a second location which may be any location within range R from the second terrestrial transmitter. The wireless transmission route from the second transmitter to the second location is at an angle to a properly oriented satellite receiving antenna (in a satellite reception position) at the second location to produce terrestrial input signals below the interference level with respect to the satellite input signals which result from satellite signals received by a satellite receiving antenna at the second location.

EXAMPLE

A test was conducted using a mobile test antenna. The test equipment included a DBS receiving antenna connected to signal processing equipment. The signal processing equipment was connected to receive input signals from the DBS receiving antenna and operated to direct a desired channel output to a television. The DBS receiving antenna was a directional antenna providing a gain of between 31 dB and 34 dB across a look angle of approximately 5 degrees on either side of the antenna centerline. Antenna gain from the DBS receiving antenna ranged from −2 dB to −16 dB outside of the antenna look angle.

The test used a terrestrial transmitter having a directional transmitter antenna elevated to 52 feet AGL (above ground level) and directed with its peak power output at an azimuth of 180 degrees (due South), with true horizontal polarity. The terrestrial transmitter set up was not changed from this configuration throughout the test. Only the transmission power was varied as will be discussed below.

The interference test was conducted at several different test locations or user locations, each spaced apart from the terrestrial transmitter location. At each test location the DBS receiving antenna was first elevated to achieve a line of sight to the terrestrial transmitter and then oriented with its centerline aligned generally with the wireless transmission route from the terrestrial transmitter. Once a line of sight was verified between the DBS test antenna and the terrestrial transmitter, an isotropic receive power level was established from the terrestrial transmitter at full power, 29 dBm.

At each test location the DBS receiving antenna was then optimally positioned for receiving satellite signals from a particular DBS satellite, that is, the centerline of the DBS receiving antenna was aligned with the signal route from the satellite. The satellite signals at a particular frequency were received and fed to the television associated with the test apparatus. At each test site, the wireless transmission route from the terrestrial transmitter to the test site was outside of the look angle of the DBS receiving antenna optimally positioned for receiving satellite signals from the DBS satellite. The terrestrial transmitter was operated to transmit at the same frequency as the received satellite signals, 12.470 gigahertz. In each test if there was interference with the received DBS satellite signals, as indicated by imperfect television reception, the terrestrial transmitter power was reduced until no interference was produced and this level, that is, the power level just below the interference level, was recorded.

At the weather conditions at which the tests were conducted, the satellite signal power level at each test site is calculated to be approximately −125 dBm. Under these conditions a terrestrial transmission power level of 13 dBm produced an exclusion zone in the transmission directions around the terrestrial transmitter of approximately one quarter mile while producing usable terrestrial signals at a location approximately 9.9 miles away from the terrestrial transmitting antenna. It is estimated that the terrestrial signal power level at this test site was approximately −137 dBm.

The above described preferred embodiments are intended to illustrate the principles of the invention, but not to limit the scope of the invention. Various other embodiments and modifications to these preferred embodiments may be made by those skilled in the art without departing from the scope of the following claims.

The invention claimed is:

1. A method for reusing a first transmission frequency already in use for transmitting satellite signals from a satellite along a satellite signal route to a first location for reception with a satellite receiving antenna which is physically oriented at the first location with an aperture of the satellite receiving antenna encompassing the satellite signal route to the first location, the satellite signals having a signal power level at the first location to produce satellite input signals at least at a minimum usable satellite input signal level when received within the aperture of the satellite receiving antenna at the first user location, the method comprising the step of:

(a) transmitting terrestrial signals at the first transmission frequency from a first terrestrial transmitter, the terrestrial signals being transmitted in directions including a wireless transmission route from the first terrestrial transmitter to the first location, the wireless transmission route lying at an angle from the satellite signal route such that the terrestrial signals present at the first location produce terrestrial input signals from the satellite receiving antenna that has been physically oriented to receive the satellite signals within the aperture of the satellite receiving antenna, the terrestrial input signals being at a power level less than an interference power level with respect to the satellite input signals, and the terrestrial signals present at the first location also having a power level at least at a minimum usable terrestrial signal level.

2. The method of claim 1 wherein the satellite receiving antenna is a dish-type antenna.

3. The method of claim 1 wherein the satellite transmits satellite signals along a satellite signal route to a second location for reception with a satellite receiving antenna which is physically oriented at the second location with an aperture of the satellite receiving antenna at the second location encompassing the satellite signal route to the second location, the satellite signals having a signal power level at the second location to produce satellite input signals at least at a minimum usable satellite input signal level when received within the aperture of the satellite receiving antenna at the second location, and wherein the method further comprises the step of:

(a) transmitting second terrestrial signals at the first transmission frequency from a second terrestrial transmitter along a second wireless transmission route to the second location, the second terrestrial transmitter having an effective transmission area which is different from an effective transmission area for the first terrestrial transmitter, the second wireless transmission route lying at an angle from the satellite signal route to the second location such that the second terrestrial signals present at the second location produce second terrestrial input signals from the satellite receiving antenna that has been physically oriented at the second location to receive the satellite signals within the aperture thereof, the second terrestrial input signals being at a power level less than an interference power level with respect to the satellite input signals at the second location, and the second terrestrial signals present at the second location also having a power level at least at the minimum usable terrestrial signal level.

4. The method of claim 3 wherein the first terrestrial transmitter and the second terrestrial transmitter simultaneously transmit the same data at the first transmission frequency.

5. The method of claim 3 wherein the effective transmission area of the first terrestrial transmitter overlaps with the effective transmission area of the second terrestrial transmitter.

6. The method of claim 3 wherein:
(a) the effective transmission area of the first terrestrial transmitter and the effective transmission area of the second terrestrial transmitter do not overlap; and
(b) the first terrestrial transmitter and the second terrestrial transmitter simultaneously transmit different data at the first transmission frequency.

7. The method of claim 1 wherein the satellite transmits satellite signals along a satellite signal route to a second location for reception with a satellite receiving antenna which is physically oriented at the second location with an aperture of the satellite receiving antenna at the second location encompassing the satellite signal route to the second location, the satellite signals having a signal power level at the second location to produce satellite input signals at least at a minimum usable satellite input signal level when received within the aperture of the satellite receiving antenna at the second location, and wherein the method further comprises the step of:

(a) transmitting the terrestrial signals at the first transmission frequency from the first terrestrial transmitter along a second wireless transmission route to the second location, the second wireless transmission route lying at an angle from the satellite signal route to the second location such that the terrestrial signals present at the second location produce terrestrial input signals from the satellite receiving antenna which has been physically oriented at the second location to receive the satellite signals within the aperture thereof, the second terrestrial input signals being at a power level less than an interference power level with respect to the satellite input signals at the second location, and the second terrestrial signals present at the second location also having a power level at least at the minimum usable terrestrial signal level.

8. An apparatus for simultaneously providing terrestrially transmitted signals on a common frequency with satellite signals transmitted from a satellite along a satellite signal route to a first location, the satellite signals being transmitted at a first frequency and having a signal power level at the first location to produce satellite input signals at least at a minimum usable satellite input signal level when received with a satellite receiving antenna physically oriented at the first location in a satellite reception position in which an aperture of the satellite receiving antenna encompasses the satellite signal route to the first location, the apparatus comprising:
(a) a first terrestrial transmitter for transmitting terrestrial signals at the first frequency along a wireless transmission route from a first terrestrial transmitter location to the first location, the wireless transmission route lying at an angle from the satellite signal route such that the terrestrial signals present at the first location produce terrestrial input signals from the satellite receiving antenna oriented in the satellite reception position at the first location, the terrestrial input signals being at a power level less than an interference level with respect to the satellite input signals, the terrestrial signals present at the first location also having a power level at least at a minimum usable terrestrial signal level.

9. The apparatus of claim 8 wherein the first terrestrial transmitter transmits along a plurality of wireless transmission routes from the first terrestrial transmitter, each wireless transmission route lying at an angle to a satellite signal route from the satellite to a location along the respective wireless transmission route, the angle to the respective satellite signal route being such that the terrestrial signals present at the respective location along the wireless transmission route produce terrestrial input signals from a respective satellite receiving antenna physically oriented at the respective location with an aperture of the respective satellite receiving antenna encompassing the satellite signal route to the respective location, the terrestrial input signals from the respective satellite receiving antenna being at a power level less than the interference level with respect to satellite input signals produced from the satellite signals received at the respective satellite receiving antenna at the respective location.

10. The apparatus of claim 8 further comprising a second terrestrial transmitter at a second transmitter location for transmitting terrestrial signals at the first frequency, the second terrestrial transmitter having an effective transmission area which is different from an effective transmission area for the first terrestrial transmitter.

11. The apparatus of claim 10 wherein the effective transmission area of the first terrestrial transmitter overlaps with the effective transmission area of the second terrestrial transmitter.

12. The apparatus of claim 10 wherein:
(a) the effective transmission area of the first terrestrial transmitter and the effective transmission area of the second terrestrial transmitter do not overlap; and
(b) the first terrestrial transmitter and the second terrestrial transmitter simultaneously transmit different data at the first frequency.

13. A method for reusing a first transmission frequency already in use for transmitting satellite signals from a satellite along a satellite signal route to a first location for reception with a satellite receiving antenna which is physically oriented at the first location with an aperture of the satellite receiving antenna encompassing the satellite signal route to the first location, the satellite signals having a sufficient signal power level at the first location to result in satellite input signals from the satellite receiving antenna which are at least at a minimum usable satellite input signal level, the method comprising the steps of:
(a) transmitting terrestrial signals at the first transmission frequency from a first terrestrial transmitter to the first location, the terrestrial signals present at the first location resulting in terrestrial input signals from the satellite receiving antenna such that the satellite input signals at the satellite receiving antenna are distinguishable from the terrestrial input signals; and
(b) receiving the terrestrial signals with a terrestrial receiving antenna at the first location to produce terrestrial input signals from the terrestrial receiving antenna which are distinguishable from any satellite input signals at the terrestrial receiving antenna resulting from satellite signals transmitted from the satellite to the first location.

14. An apparatus for simultaneously transmitting terrestrial signals on a common frequency with satellite signals transmitted from a satellite, the satellite transmitting satellite signals at a first frequency along a satellite signal route to a first location for reception with a satellite receiving antenna which is physically oriented at the first location with an aperture of the satellite receiving antenna encompassing the satellite signal route to the first location, the satellite signals having a signal power level at the first location to produce satellite input signals at least at a minimum usable satellite input signal level when received within the aperture of the satellite receiving antenna, the apparatus comprising:
(a) a terrestrial transmitter for transmitting terrestrial signals at the first frequency to the first location from a fixed terrestrial location which forms a fixed geometry with the first location and the satellite, the terrestrial transmitter being located with respect to the first location such that the terrestrial signals present at the first location result in terrestrial input signals from the satellite receiving antenna at the first location which are at a power level less than an interference power level with respect to the satellite input signals produced by the satellite receiving antenna at the first location; and
(b) a terrestrial receiving antenna at the first location, the terrestrial receiving antenna receiving the terrestrial signals transmitted from the terrestrial transmitter to produce terrestrial input signals which are distinguishable from any satellite input signals at the terrestrial receiving antenna resulting from satellite signals transmitted from the satellite to the first location.

* * * * *